United States Patent [19]
Condon

[11] Patent Number: 5,956,714
[45] Date of Patent: Sep. 21, 1999

[54] QUEUING SYSTEM USING A RELATIONAL DATABASE

[75] Inventor: Roger Kirk Condon, St. Louis, Mo.

[73] Assignee: Southwestern Bell Telephone Company, San Antonio, Tex.

[21] Appl. No.: 08/910,354

[22] Filed: Aug. 13, 1997

[51] Int. Cl.$^6$ .................................................. G06F 17/30
[52] U.S. Cl. ................................ 707/8; 707/4; 707/201
[58] Field of Search .................................. 707/4, 8, 201

[56] References Cited

U.S. PATENT DOCUMENTS

| | | | |
|---|---|---|---|
| 4,694,396 | 9/1987 | Weisshaar et al. | 395/200.3 |
| 5,023,776 | 6/1991 | Gregor | 364/200 |
| 5,081,572 | 1/1992 | Arnold | 711/163 |
| 5,170,480 | 12/1992 | Mohan et al. | 707/201 |
| 5,459,862 | 10/1995 | Garliepp et al. | 707/8 |
| 5,544,051 | 8/1996 | Senn et al. | 707/3 |
| 5,546,570 | 8/1996 | McPherson, Jr. et al. | 707/4 |
| 5,623,693 | 4/1997 | Ashton et al. | 395/825 |
| 5,781,912 | 7/1998 | Demers et al. | 707/202 |

OTHER PUBLICATIONS

Jenq, B.–C., "A queueing network model for a distributed database testbed system", IEEE Transactions on Software Engineering, Jul. 1988 pp. 908–921, Jun. 1988.

Jenq, B.–C., "Locking performance in a shared nothing parallel database machine", IEEE Transactions on Knowledge and Date Engineering, Dec. 1989 pp. 530–543, Dec. 1989.

Michael, Maged M., "Simple, Fast, and Practical Non–Blocking and Blocking Concurrent Queue Algorithms", ACM 1996 pp. 267–275, Feb. 1996.

Melliar–Smith, Peter M., "Surviving Network Partitioning", IEEE Transactions on Computer Mar. 1998 pp. 62–68.

Prakash, Sundeep, "A Nonblocking Algorithm for Shared Queues Using Compare–and–Swap", IEEE Transactions on Computers, vol. 43, No. 5 May 1994 pp. 548–559.

Ronngren, Robert, "Lazy Queue: An Efficient Implementation of the Pending–event Set", IEEE 1991 pp. 194–204, Jan. 1991.

Ronngren, Robert, "A Comparative Study of Parallel and Sequential Priority Queue Algorithms", ACM Transactions of Modeling and Computer Simulation, vol. 7, No. 2, Apr. 1997 pp. 157–209.

Stone, Janice M., "A simple and correct shared–queue algorithm using Computer–and–Swap", IEEE 1990 pp. 495–504, May 1990.

(List continued on next page.)

*Primary Examiner*—Wayne Amsbury
*Assistant Examiner*—Shahid Alam
*Attorney, Agent, or Firm*—Greenblum & Bernstein P.L.C.

[57] ABSTRACT

A queuing system for manipulating items sent between a plurality of application servers comprising a queue implemented in a table stored in a relational database system. Storing the table in a database allows recovery of the queue at any moment in time in case of a system malfunction. A queue handling system which manipulates queue items is provided. Also, a plurality of database queue handler servers are provided, each server monitoring the queue in order to determine when an item is ready to be dequeued. If a ripe item is found, the database queue handler server calls the queue handling system which in turn calls precompiled logic to dequeue the ripe items. Each database queue handler server subsequently forwards the dequeued items to the correct application server for processing. Logical partitions may be provided to prevent more than one database queue handler server from simultaneously accessing items in the queue. In addition, a system is provided which handles an application server's failure to process a queue item in which, after a predetermined number of failures, the item is moved to a special error table rather then returned to the original queue.

14 Claims, 6 Drawing Sheets

Microfiche Appendix Included
(1 Microfiche, 45 Pages)

OTHER PUBLICATIONS

BEA Systems, Inc., "BEA Message Q Datasheet" available at http:./www.beasys.com/products/mq/mqdata.htm, 1997..

BEA Systems, Inc., "BEA Tuxedo White Paper—Programming a Distributed Application: The BEA Tuxedo Approach" available at http://www.beasys.com/products/tuxedo/tuxwp_pda/tuxwp_pda.htm, May 1996.

BEA Systems, Inc., "BEA Tuxedo White Paper—Inter—Application Transaction Processng with BEA Domains" available http://www.beasys.com/products/tuxedo/tuxwp_itp/tuxwp_itp.htm, Dec. 1996.

BEA Systems, Inc., "BEA Tuxedo White Paper—BEA Tuxedo and the OSF Distributed Computing Environment" available at http://www.beasys.com/products/tuxedo/tuxwp_dce.htm, May 1996.

BEA Systems, Inc., "BEA Tuxedo White Paper—Reliable Queuing Using BEA Tuxedo" available at http://www.beasys. com/products/tuxedo/tuxwp_que.htm, May 1996.

BEA Systems, Inc., "BEA Tuxedo System White Paper", available at http://www.beasys.com/products/tuxedo/tuxwp_pm/tuxwp_pm1.htm, http://www.beasys.com/products/tuxedo/tuxwp_pm/tuxwp_pm2.htm, http://www.beasys.com/products/tuxedo/tuxwp_pm/tuxwp_pm3.htm, http://www.beasys.com/products/tuxedo/tuxwp_pm/tuxwp_pm4.htm and http://www.beasys.com/products/tuxedo/tuxwp_pm/tuxwp_pm5.htm.

| NAME | NULL? | TYPE |
| --- | --- | --- |
| Q_SEQ_NUM | NOT NULL | NUMBER (10) |
| Q_DATA | NOT NULL | LONG RAW |
| PARTITION_NUM | NOT NULL | NUMBER (4) |
| DUE_TSTAMP | NOT NULL | DATE |
| CORRELATION_NUM | NOT NULL | NUMBER (10) |
| RETRY_NUM | NOT NULL | NUMBER (4) |
| PRIORITY | NOT NULL | NUMBER (10) |

FIG. 6

QUEUING SYSTEM USING A RELATIONAL DATABASE

REFERENCE TO MICROFICHE APPENDIX

This application includes a microfiche appendix for Appendix A. The microfiche appendix consists of one microfiche having forty five frames.

A portion of the disclosure of this patent document contains material that is subject to copyright protection. The copyright owner has no objection to the facsimile reproduction by anyone of the patent document or the patent disclosure, as it appears in the Patent and Trademark Office patent file records, but otherwise reserves all copyright rights whatsoever.

BACKGROUND OF THE INVENTION

1. Field of the Invention

The present invention is related to a system for message queuing. More particularly, the present invention relates to a system for handling items sent between software applications utilizing, amongst other things, a relational database for storing a queue.

2. Background Information

Many business tasks require a series of steps to perform a job. In a computer system having multiple applications required to complete a job, one application finishes its part of the process and then sends the results to the next application. The receiving application will in turn finish its part of the job and pass on its results to the next application. This process is repeated until all the applications have finished their parts of the job resulting in completion of the job.

A problem is encountered with this system when one application sends its results to the next program, and the receiving application has to interrupt processing to receive the incoming data. In the alternative, the application sending the information may defer processing the next task and wait until the receiving application is finished its processing. In either case, resources are wasted.

Some reasons the receiving application may not be able to immediately receive the information sent from the sending application are that the receiving application may be down or may not operate during the same period the sending application operates. Additionally, the receiving application may run on a less powerful computer, may share a computer with other tasks, or possibly the receiving application's processing is more complicated than the sending application's processing. If the mismatch in processing capability between the sending and receiving system is temporary, queues can be used as a buffer between the two systems.

Thus, queued messaging is a solution to the problem. Queued messaging allows interoperating programs to exchange data asynchronously. When the parties communicate by leaving messages, we say that communication is asynchronous. Asynchronous communication requires the messages be left somewhere. In other words, the sending application may post the message to a queue upon completion of its part of the process. The receiving computer need not be ready at that moment and may dequeue the message from the queue and receive the message when the receiving program is finished processing the previous task.

A known system called TUXEDO /Q available from BEA Systems, Inc. located in Sunnyvale, Calif. is designed to handle asynchronous communications. /Q receive messages from one application and stores the items in a queue stored in a flat file format. A flat file format is a file such as an ASCII file where alterations to the file are not recorded. /Q then dequeues the messages from the queue stored in the flat file format and forwards the items to the receiving application when the receiving application is available.

However, a disadvantage of the flat file format that /Q uses to store the queue is with regard to recovery of the queue. For example, if something happens to the queuing system and the queue data becomes corrupted or lost, the only way to recover the data is to restore the last backup. There are a variety of events which may cause the queue data to be lost including natural disasters, a power surge, or power failure, equipment failure . . . Backups of flat file formats are not made continuously because the only time data may be backed up is when the system is quiescent. Thus, continuous backups would result in a significant loss of processing time. Therefore, backups are typically made infrequently (e.g., daily or weekly) and a substantial amount of data may be lost (i.e., all messages stored since the last backup).

In the alternative to storing the queue on disk, the queue may be stored in main memory. Main memory queues eliminate the overhead of disk writing. However, main memory queues have a great potential for loss because if the computer stops operation before the intended target retrieves the message, the queue is lost.

Thus, there is a need for a queuing system with a more reliable recovery method.

SUMMARY OF THE INVENTION

In view of the foregoing, the present invention, through one or more of its various aspects, embodiments and/or specific features or subcomponents, is thus intended to bring about one or more of the objects and advantages as specifically noted below. The general object of the present invention is to provide an apparatus and method for a queuing system which handles items sent between a plurality of applications.

More particularly, an object of the present invention is to provide a queue stored in a relational database system which allows recovery of the queue at any moment in time in case of a system malfunction. A queue handling system is also provided which manipulates queue items. Moreover, a plurality of database queue handler (DBQH) servers are provided. Each DBQH server monitors the queue in order to discover when an item is ready to be dequeued and calls the queue handling system to dequeue all items ready for dequeuing. Each DBQH server subsequently forwards the dequeued item to the correct application for processing.

According to one embodiment of the present invention, the queue handling system calls preexisting modules to perform the queue operations. In another embodiment, an application server also calls the queue handling system to handle queue items. In a preferred embodiment, the queue comprises a table and each queue item is associated with a plurality of data fields. One data field may be a logical partition number.

In another embodiment, there is a DBQH server for each application server. In this embodiment, each DBQH server monitors and processes all rows having the same logical partition number while contemporaneously locking the rows to prevent other DBQH servers from simultaneously accessing the rows. The DBQH servers monitor all rows associated with the logical partition number until all the associated rows have been monitored and processed. Each server, upon completion of processing, unlocks the rows and proceeds to monitor and process the rows associated with a subsequent logical partition number. Preferably, there are 10 logical partitions.

In another preferred embodiment, the DBQH server enters a sleep mode, i.e., becomes inactive, thus conserving resources of the system if the server cycles through all the logical partitions and finds no data to process. The server enters the sleep mode for a predetermined period of time before resuming monitoring and processing.

A further object of the present invention is to provide a method for having a DBQH server extract data from a queue. The method comprises selecting a logical partition number associated with a plurality of rows in a table representing a queue. The table must be stored in a database system. Then, access to all rows associated with each selected logical partition number is locked. Thus, no other DBQH server can access data from the locked rows. The rows are monitored to discover if any items are ripe for dequeuing. If an item is ripe, the item is dequeued and forwarded to the proper application. After all rows associated with a selected logical partition number have been monitored and processed, access is unlocked so other servers may access the data. The next logical partition number is selected and locked and the process is continuously repeated.

In another preferred embodiment, the DBQH server recognizes if an application server fails to process an item. Upon realization that the application failed to process the item, the DBQH server reenqueues the item into the queue and the server increments by one a fail value associated with the item. The server may also determine if the fail value exceeds a predetermined number in which case the server enqueues the item into a special error table rather than back into the original queue.

BRIEF DESCRIPTION OF THE DRAWINGS

The present invention is further described in the detailed description which follows by reference to the noted drawings by way of non-limiting examples of preferred embodiments of the present invention, in which like reference numerals represent similar parts throughout the several views of the drawings.

These and other features, aspects and advantages of the present invention will become better understood with regard to the following description, appended claims and accompanying drawings.

FIG. 6 illustrates an example of the table representing the queue.

BRIEF DESCRIPTION OF THE APPENDIX

Appendix A is a listing of the source code of an exemplary implentation of the queuing system of the present invention.

DETAILED DESCRIPTION OF THE PREFERRED EMBODIMENTS

Figure 1:
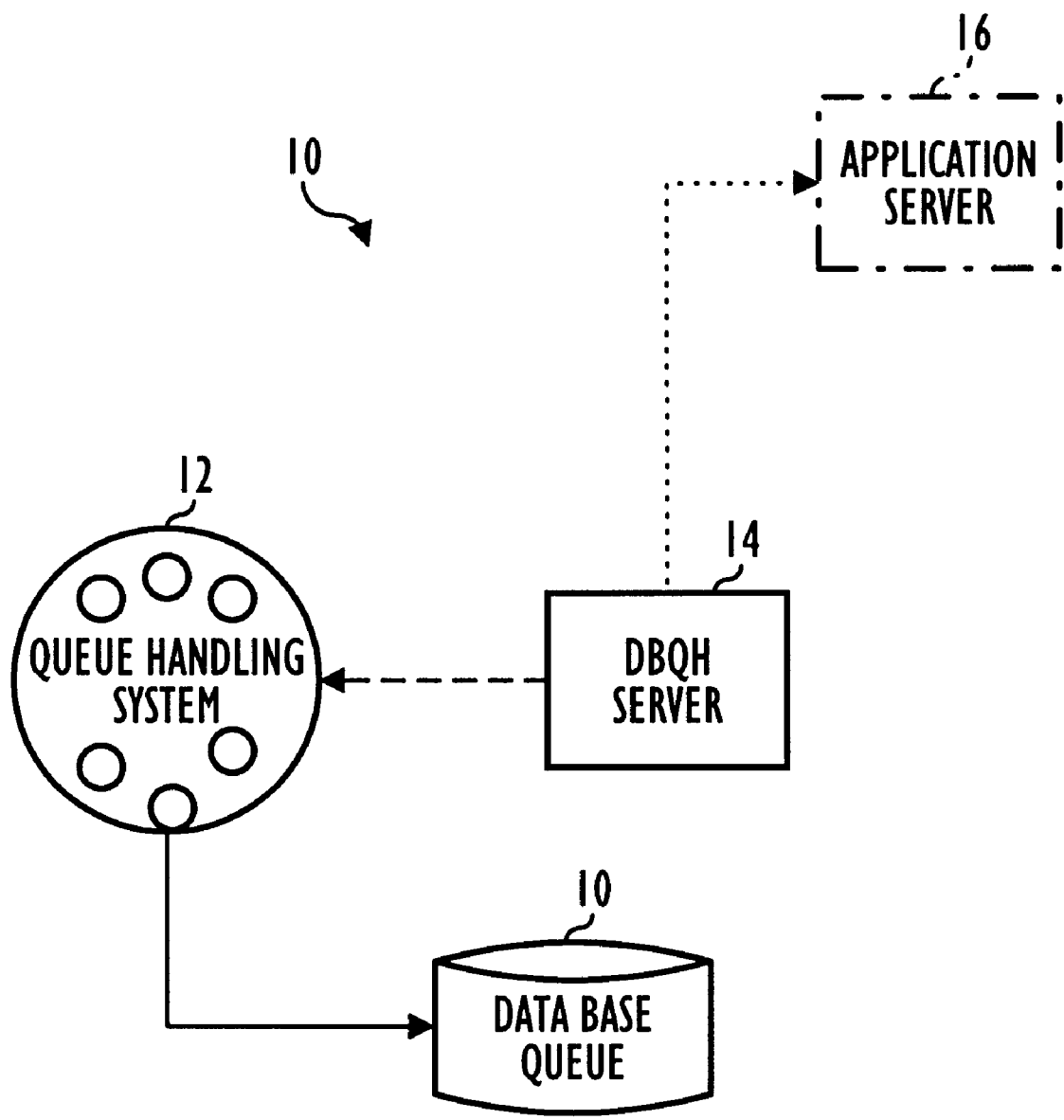
FIG. 1 illustrates a queuing system in accordance with one embodiment of the present invention.

Referring now to the accompanying drawings, FIG. 1 illustrates a general flow diagram of the queuing system in accordance with a first embodiment of the present invention. A queuing system is shown generally as 10 having a queue stored in a relational database 10, e.g., Oracle version 7.2 available from Oracle Corp. located in Redwood Shores, Calif., or any similar database. An advantage of storing the queue in a relational database is being able to restore the queue in the case of a system malfunction without losing any items stored in the queue.

The queuing system preferably resides on a platform running the Solaris operating system version 2.4. Within the queuing system, a queue handling system 12 is provided which receives commands from a database queue handler (DBQH) server 14 to handle the queue items. An example of the above-mentioned platform may be found in U.S. application Ser. No. 08/331,892 to JOST et al., U.S. Pat. No. 5,517,148, which is incorporated herein by reference in its entirety. The DBQH server 14 continuously monitors the queue to determine when an item on the queue is ripe for dequeuing. The monitoring is done by selecting each item in the queue with standard structured query language (SQL) select statements and analyzing the selected item. The DBQH server 14 does not directly perform queue functions, but rather acts on the queue via the queue handling system 12 which performs all operations on the queue. If an item is found to be ripe for dequeuing, the DBQH server 14 has the item deleted from the queue and forwards the item to the proper application server 16 for processing. The item is deleted from the queue by an SQL delete statement.

Figure 2:
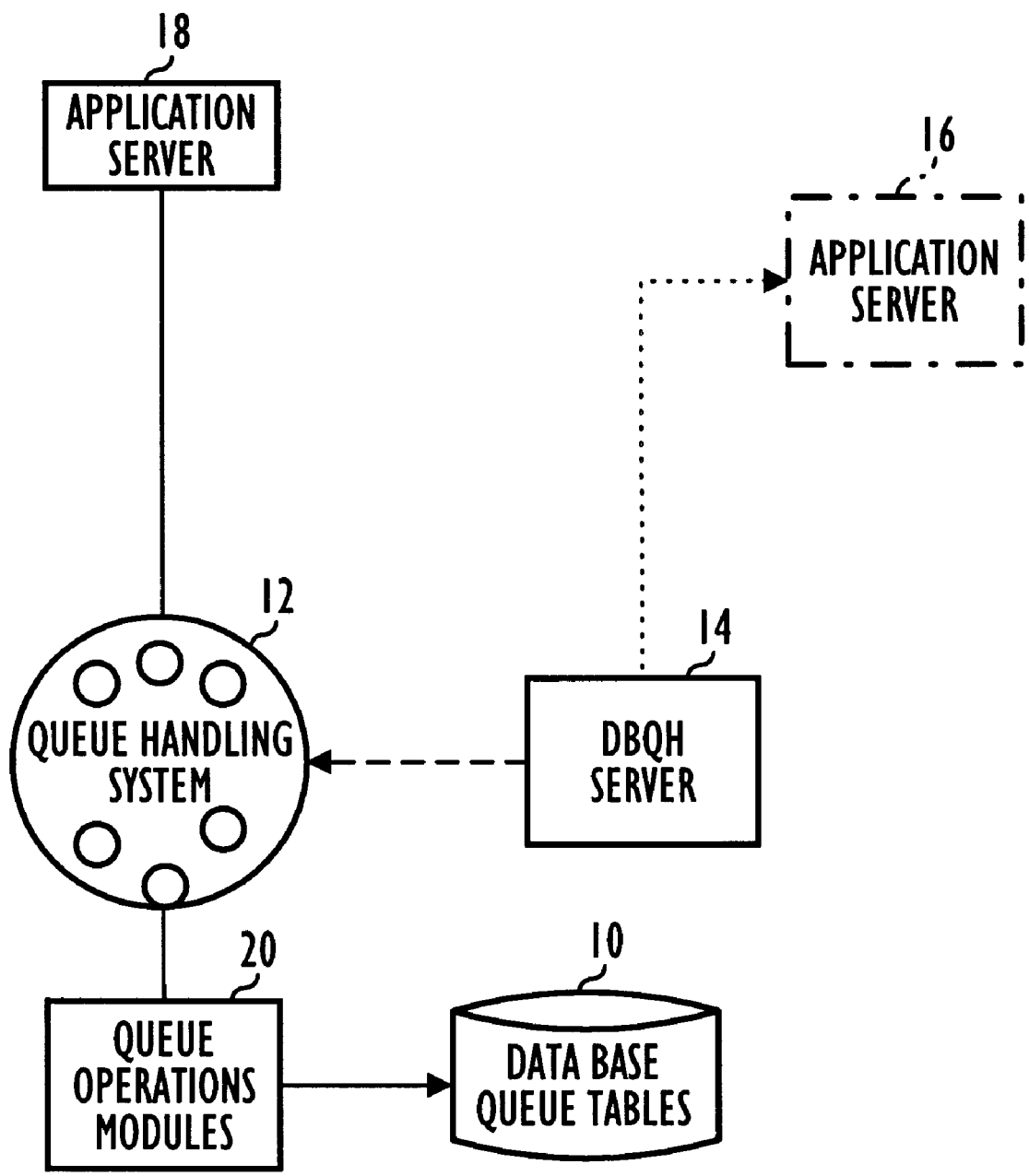
FIG. 2 illustrates a second embodiment of a queuing system in accordance with the present invention.

FIG. 2 shows an alternative embodiment in which a second (or additional) application server 18 may also select, update or delete items from the queue stored in the database 10 by commanding the queue handling system 12 to perform the requested operations. In this embodiment, the queue handling system 12 operates on the database 10 via queue operation modules 20 which have been previously compiled and perform all queue functions. All requests for operations on the queue go through the queue operation modules 20 so as to eliminate duplication of logic. This common logic is shared by both the DBQH server 14 and application server 18.

Various types of queues may be stored in the database. For example, time based, priority based and first-in first-out (FIFO) base queues may all be implemented. Items in a time based queue are ready for dequeuing when a certain moment in time is reached (e.g., a specific date and time). At that point, the DBQH server 14 removes the item from the queue and forwards it to the proper application server 16. In a FIFO queue, the first items into the queue are the first ones out, i.e., first in first out or it's a first come first serve basis. The DBQH server 14 removes an item when it is at the front (top) of the queue. Priority based queues give certain items a higher priority with respect to other items on the queue. The items having a high priority are dequeued before items at the front of the queue.

The queue is generally implemented by a table stored in the database 10 and are statically linked to the application programs. The tables are defined generically and have several fields. The fields may be: a field to hold the data; a field to serve as a unique identifier (primary key); a priority field so that queue items that normally would dequeue at the same time can be prioritized; a time stamp field for time based queues; an application specified field so that the application can put its own identifier in the queue message; a retry field to hold the number of times the message was retried to be queued; and a field to serve as a logical partition as will be explained later. The application specified identifier makes it easier to find an item after it is put in the queue, i.e., similar to a reference number.

An example of the table can be seen in FIG. 6 using Oracle database types. The Q_SEQ_NUM is the unique identifier field. It is a low digit number. The Q_DATA field is the data field and comprises any kind of binary data. PARTITION_NUM corresponds to the logical partition field and is a four digit number. DUE_TSTAMP corresponds to the time stamp field and holds a date. CORRELATION_NUM is the application specified field and it holds a 10 digit number. RETRY_NUM is the retry filed and it holds a 4 digit number. Finally, PRIORITY corresponds to the priority field and it holds a 10 digit number. All of the fields require an entry and cannot be left null. Although these fields are used in a preferred embodiment, additional (or fewer) fields may be used as necessary.

In a typical system, there may be provided as many DBQH servers 14 as there are application servers 16 being dequeued to. This means that at any given moment, more than one DBQH server 14 may be extracting data from the table that holds the queue. In order to alleviate the problem, when items are placed into the queue with an insert procedure, a logical partition number is assigned to the item. The DBQH server 16 then uses the partition number when it selects an item from the queue. In a preferred embodiment, the system has ten logical partitions per table. In another preferred embodiment, the value for the logical partition of any row may be calculated by performing a mod function on the unique numerical identifier of the row, thus allowing for even distribution of the data among the logical partitions. Other numbers of logical partitions may be used and other methods of calculating the value may be used.

Figure 3:
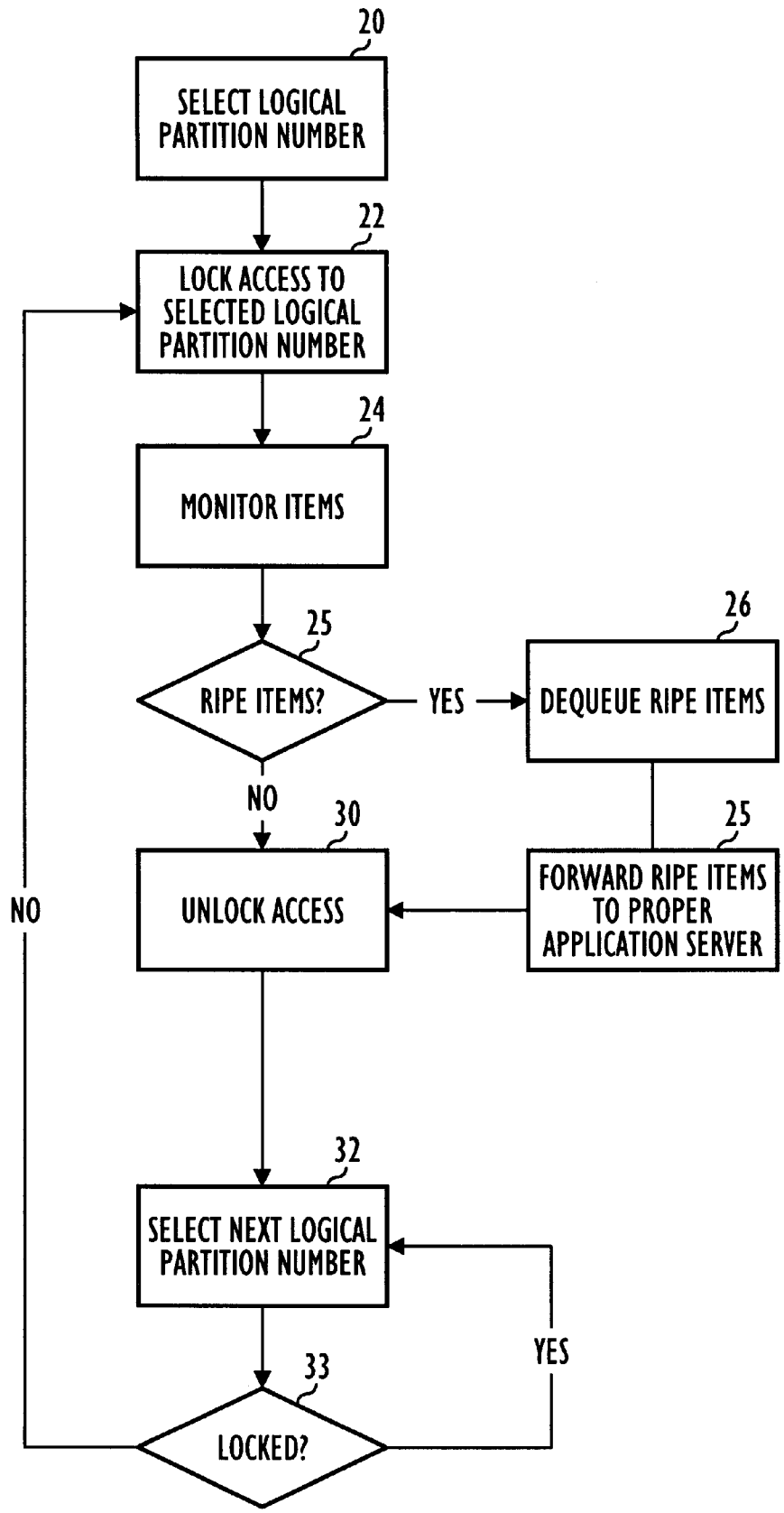
FIG. 3 illustrates a logical flow diagram of the database queue handler server extracting data when multiple servers are in use.

The process by which the DBQH server 14 selects items from the queue using the logical partition number is illustrated in the flow chart shown in FIG. 3. At step 20, a logical partition number is selected. Each logical partition number has a plurality of rows associated with the logical partition number. At step 22, the DBQH server then locks access to rows associated with the selected logical partition number. The DBQH server 14 then monitors all rows associated with the logical partition number at step 24 to determine whether or not any items are ripe for dequeuing, taking into account the type of queue being monitored. If a ripe item is found at step 25, the DBQH server 14 dequeues the ripe item at step 26 and forwards it to a proper application server 16 at step 28. After the items are forwarded, access to the logical partition number is unlocked. If it is determined the items are not ripe for dequeuing at step 25, then the DBQH server 14 unlocks access to the logical partition number in use at step 30.

Next, a subsequent logical partition number is selected at step 32. If one DBQH server 14 is processing the rows in one partition and another DBQH server 14 tries to select those rows, the second DBQH server 14 will not retrieve any rows because the first DBQH server 14 maintains a lock on the rows for its own exclusive use. Consequently, the second DBQH server 14 will proceed to the next partition to determine if any rows are available there for processing. This process repeats until a logical partition number which is not locked by another DBQH server 14 is found, at which point the process returns to step 22 and continues in the manner described above.

Figure 4:
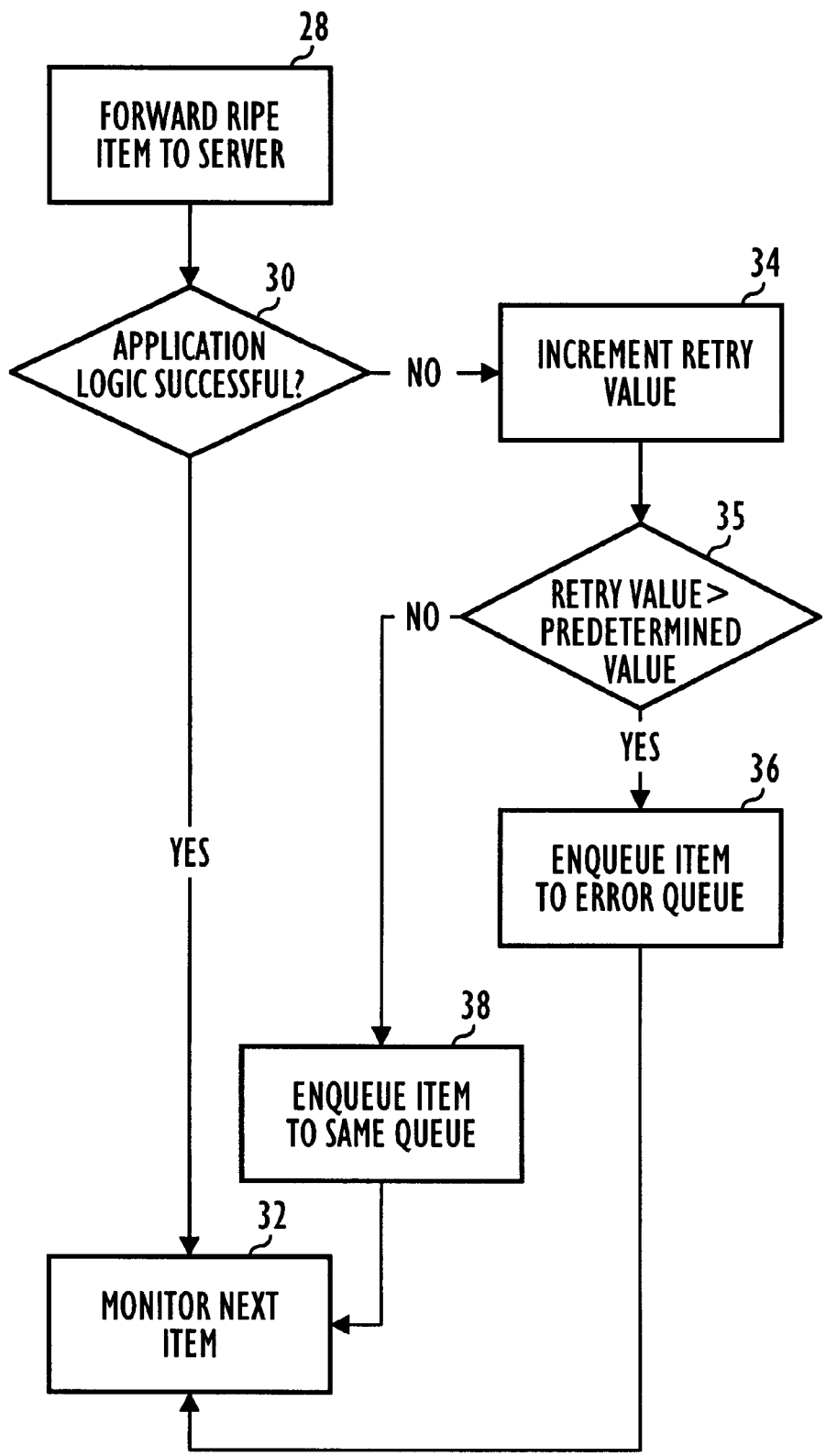
FIG. 4 illustrates a logical flow diagram of the DBQH server's behavior when an application fails to process a queue item.

FIG. 4 illustrates an alternative embodiment which accounts for a failure by the application logic to process the item. After the ripe item is forwarded at step 28 (FIGS. 3 and 4) to the application server 16, the application logic attempts to process the item at step 30. If the application logic is successful at processing the item, then at step 32 the next item is monitored, as previously described. However, if the application logic is unsuccessful in processing the item, a value in a retry field is incremented by one at step 34. The retry value is then compared with a value argued in at boot up at step 35. The argued in value determines how many times an application is allowed to try to process an item before the item is removed from the queue. If the retry value is greater than the predetermined value, the item is placed in an error table at step 36. The error table holds the data, the name of the queue the data came from, and a time stamp to mark when the failure occurred. Then, the next item is monitored at step 32. If, however, the retry value is not greater than the predetermined value, the item is enqueued to the same queue at step 38 before the next item is monitored.

Figure 5:
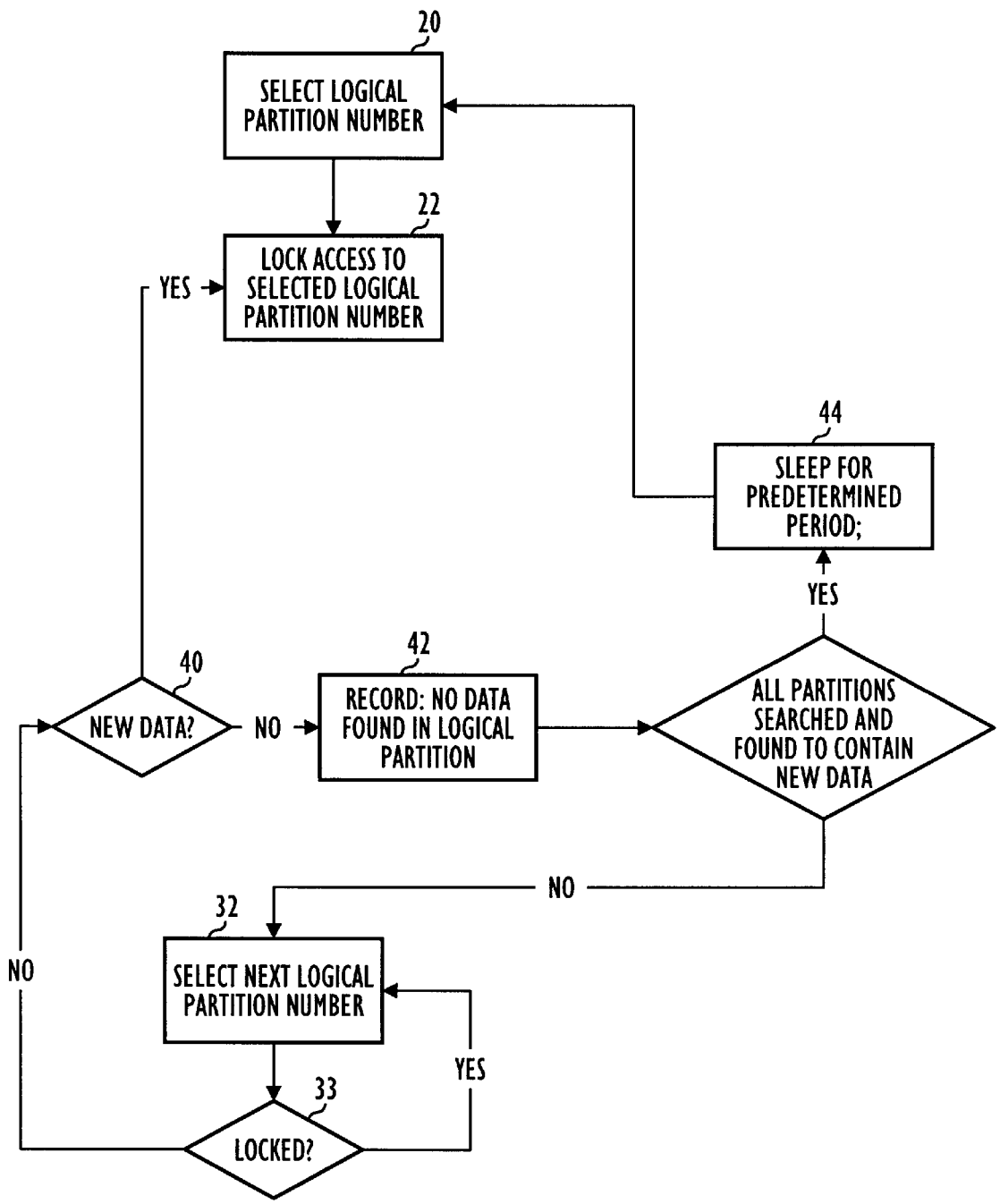
FIG. 5 illustrates a logical flow diagram of the DBQH server's sleep mode.

FIG. 5 illustrates the logic used if a sleep mode is provided. In another preferred embodiment, the DBQH server 14 may enter a sleep mode, or remain inactive, thus conserving resources of the system. For example, if the server cycles through all the logical partitions and finds no data to process, the server may enter the sleep mode for a predetermined period of time.

Returning to where a selected logical partition number is examined and determined not to be locked (step 33 in FIGS. 3 and 5), an inquiry is made into whether new data has been found at step 40 in the rows associated with the selected logical partition number. If new data is found, access to the selected logical partition number is locked at step 22 and the process continues as previously described. However, if new data is not found, the DBQH server 14 notes this event at step 42. If the DBQH server 14 cycles through ten partitions without finding new data to process, the dequeuer goes to sleep for a predetermined period at step 44. The predetermined period is argued in when the dequeuer is booted. The sleep mode allows the system to enter a state where resources are not consumed when there are no rows to be processed. After the sleep period has concluded, the process resumes at step 20 as shown in FIG. 3.

Although the present invention has been described in considerable detail with reference to certain preferred versions, other versions are possible. Therefore, the spirit and scope of the appended claims should not be limited to the description of the preferred versions contained herein.

What is claimed:

1. A queuing system including a relational database system for manipulating items communicated between a plurality of application servers, the relational database system providing for recovery of a queue in the event of a system malfunction, the queuing system comprising:

a queue, stored in the relational database system;

a queue handling system which manipulates queue items; and a plurality of database queue handler servers, each server monitoring the queue to determine when an item is to be dequeued, and calling the queue handling system to dequeue all ripe items, each database queue handler server subsequently forwarding the dequeued item to the correct application server for processing.

2. The queuing system according to claim 1, in which the queue handling system calls preexisting modules to perform the queue operations.

3. The queuing system according to claim 2, in which an application server calls the queue handling system to manipulate queue items.

4. The queuing system according to claim 1, in which the queue comprises a table with each item in the table being associated with a plurality of data fields.

5. The queuing system according to claim 4, in which each row of the table is assigned a logical partition number, each database queue handler server monitoring and processing all rows having the same logical partition number, while contemporaneously locking the rows thus preventing other servers from simultaneously accessing the rows, each server upon completion of processing, unlocking the rows and proceeding to monitor and process the rows associated with a subsequent logical partition number, repeating this procedure continuously.

6. The queuing system according to claim 5, in which the database queue handler server sleeps for a predetermined period of time if the server cycles through all the logical partition numbers and finds no data to process.

7. The queuing system according to claim 5, in which the number of logical partitions is ten.

8. The queuing system according to claim 1, in which there is one database queue handler for every application server.

9. A method of extracting data from a queue using a database queue handler server, comprising:

selecting a logical partition number associated with a plurality of rows in a table stored in a relational database system, the table representing a queue; and continuously repeating the following:
locking access to all rows associated with the selected logical partition number;
monitoring the rows to discover items ready for dequeuing;
dequeuing the ripe items;
forwarding the items to a proper application server;
unlocking access to all rows associated with the selected logical partition number;
selecting the next unlocked logical partition number.

10. A method according to claim 9, further comprising:
the database queue handler server recognizing when the application fails to process the item, reenqueuing the item in the queue, and the server incrementing by one a fail value associated with the item.

11. The method according to claim 10, further comprising:
the database queue handler server determining when the fail value exceeds a predetermined number, the server enqueuing the item in a fail queue instead of the original queue.

12. The method according to claim 9, in which the database queue handler server sleeps for a predetermined period if the server cycles through all the logical partitions and finds no data to process.

13. The method according to claim 9, in which the number of logical partitions is ten.

14. The method according to claim 9, in which there is one database queue handler for every application server.

* * * * *

UNITED STATES PATENT AND TRADEMARK OFFICE
CERTIFICATE OF CORRECTION

PATENT NO. : 5,956,714
DATED : September 21, 1999
INVENTOR(S) : R. CONDON

It is certified that error appears in the above-identified patent and that said Letters Patent is hereby corrected as shown below:

On the cover of the printed patent, at item [56], References Cited, Other Publications, line 6, "Date" should be ---Data---.

On the cover of the printed patent, page 2, Other Publications, line 8, "Processng" should be ---Processing---.

Signed and Sealed this

Third Day of April, 2001

Attest:

NICHOLAS P. GODICI

*Attesting Officer*  *Acting Director of the United States Patent and Trademark Office*